United States Patent [19]

Fujiwara et al.

[11] Patent Number: 5,089,199
[45] Date of Patent: Feb. 18, 1992

[54] METHOD FOR IMPROVING ELECTRIC CONDUCTIVITY OF A RESIN MOLDING

[75] Inventors: Hidekazu Fujiwara, Yokohama; Kenji Motogami, Takatsuki; Shigeo Mori, Kyoto, all of Japan

[73] Assignees: Dai-Ichi Kogyo Seiyaku Co., Ltd.; Kanto Jidosna Kogyo Kabushiki, both of Japan

[21] Appl. No.: 580,200

[22] Filed: Sep. 10, 1990

[30] Foreign Application Priority Data

Sep. 13, 1989 [JP] Japan .................. 1-238269

[51] Int. Cl.$^5$ .............................. C04B 35/00
[52] U.S. Cl. ..................... 264/83; 264/101; 264/104
[58] Field of Search .............. 264/104, 22, 25, 80, 264/83, 101

[56] References Cited

U.S. PATENT DOCUMENTS

| | | | |
|---|---|---|---|
| 4,578,326 | 3/1986 | Armano et al. | 429/192 |
| 4,596,669 | 6/1986 | Kleiner et al. | 264/104 |
| 4,675,143 | 6/1987 | Wahita et al. | 264/104 |
| 4,705,728 | 11/1987 | Gregory | 429/199 |
| 4,888,223 | 12/1989 | Sugimoto et al. | 264/22 |

*Primary Examiner*—James Lowe
*Assistant Examiner*—Christopher A. Fiorilla
*Attorney, Agent, or Firm*—Morgan & Finnegan

[57] ABSTRACT

A resin molding having a very improved electric conductivity is obtained by the steps of mixing with a resin a complex of a polyether and an electrolyte salt soluble in the polyether, modling the mixture and then treating the resultant molding with plasma. The polyether is selected from the group consisting of alkylene oxide polymers and copolymers, preferably selected from the group consisting of polymers of alkylene oxide having not less than 4 carbon atoms and block or random alkylene oxide copolymers containing not less than 10 weight % of at least one alkylene oxide unit having not less than 4 carbon atoms.

5 Claims, No Drawings

METHOD FOR IMPROVING ELECTRIC CONDUCTIVITY OF A RESIN MOLDING

BACKGROUND OF THE INVENTION

This invention relates to a method for improving electric conductivity of a resin molding.

As conventional methods for improving electric conductivity of a resin molding, there are the methods in which carbon black, carbon fiber or conductive mica is mixed with a resin used for molding.

However, in the conventional methods for improving electric conductivity, it is necessary, in order to substantially increase the electric conductivity, to mix a large amount of the conductive substance such as carbon black with the resin. It tends to deteriorate the physical properties of the resultant resin molding and further the resin is colored to produce such as a black resin molding. Accordingly, these problems cause difficulty in their practical uses.

The object of the present invention is to provide a method for effectively improving electric conductivity of a resin molding without the above problems, namely without deteriorating the physical properties of the resultant resin molding and coloring it.

SUMMARY OF THE INVENTION

In this invention, the electric conductivity of a resin molding is improved by mixing with a resin a complex of a specified polyether and an electrolyte salt, molding the mixture and then treating the resultant molding with plasma.

The polyether is selected from the group consisting of alkylene oxide polymers and copolymers. As the electrolyte salt, there is used that soluble in the polyether.

DETAILED DESCRIPTION OF THE INVENTION

As a resin for the resin molding according to the invention, there may be used any resin having a high surface resistance, such as polyolefin resins, e.g., polyethylene and polypropylene, ABS resin, acrylic resin, polyamide resin, polyvinyl chloride resin, polycarbonate resin, polyacetal resin and phenolic resins.

Further, as a polyether used for the complex mixed with a resin for the resin molding, there may be used any polyether selected from the group consisting of alkylene oxide polymers and copolymers as described above. Generally, polymers of an alkylene oxide having not less than 4 carbon atoms and block or random alkylene oxide copolymers containing not less than 10 weight % of an alkylene oxide unit having not less than 4 carbon atoms are preferably used, and polymers or copolymers prepared with use of alkylene oxide having at least 6 carbon atoms are most preferably used.

In general, it is preferred to use, as the polyether, one prepared by performing the polymerization reaction by using the following active hydrogen compound as the starting material; such as monoalcohols, e.g., methanol and ethanol; dialcohols, e.g., ethylene glycol, propylene glycol and 1,4-butanediol; polyhydric alcohols, e.g., glycerol, trimethylol propane, sorbitol, sucrose and polyglycerol; amine compounds, e.g., monoethanolamine, ethylenediamine, diethylenetriamine, 2-ethylhexylamine and hexamethylene diamine; and phenolic active hydrogen-containing compounds, e.g., bisphenol-A and hydroquinone. It is especially preferred to use alcohols as the starting material.

Next, as the alkylene oxides, there are preferably used those having not less than 4 carbon atoms, such as α-olefin oxides having 4 to 9 carbon atoms, e.g., 1,2-epoxybutane, 1,2-epoxypentane, 1,2-epoxyhexane, 1,2-epoxyheptane, 1,2-epoxyoctane, 1,2-epoxynonane and the like; α-olefin oxides having not less than 10 carbon atoms; styrene oxide and the like. It is especially preferred to use an α-olefin oxides having 4 to 20 carbon atoms.

The polyethers may be either of homopolymers and block or random copolymers. The sequence of the above alkylene oxides in the polyethers is not particularly limited. But it is preferred to be block or randam copolymers of at least one alkylene oxide having not less than 4 carbon atoms and ethylene oxide and/or propylene oxide. Further, block or random copolymers of at least one alkylene oxide having not less than 6 carbon atoms and ethylene oxide and/or propylene oxide are most preferably used. In the cases, it is required to contain not less than 10 weight %, more preferably not less than 50 weight %, of at least one alkylene oxide unit having not less than 4 carbon atoms. The end of the polymer may be terminated with an alkyl group such as methyl group and ethyl group.

The molecular weight of the polyether is preferably 1,000 to 100,000.

Furthermore, as the soluble electrolyte salts used to produce a complex with the polyether, there are exemplified such as inorganic salts, e.g., lithium chloride, lithium bromide, lithium iodide, lithium nitrate, lithium perchlorate, lithium thiocyanate, sodium bromide, sodium iodide, potassium thiocyanate, potassium iodide and lithium sulfonate; and organic salts, e.g., organic sulfonates and organic phosphates. The added amount is preferably 0.5 to 10 weight % based on the polyether.

The used amount of the complex of the polyether and the soluble electrolyte salt is preferably 1 to 10 weight %, more preferably 1 to 5 weight % based on the resin. Though an addition of not less than 10 weight % of it is favorable for the improvement in electric conductivity, it causes deterioration of physical properties and surface bleeding disadvantageously due to the poor compatibility to the resin.

As the method for forming a complex between the polyether and the soluble electrolyte salt, a method is preferred in which the soluble electrolyte salt is previously dissolved in a single or mixed solvent highly compatible with the polyether, such as water, methanol, methyl ethyl ketone, tetrahydrofuran, acetone and methylene chloride and the solution is mixed uniformly with the polyether to give a complex solution and then the solvent is removed to give the complex.

As the method for mixing the complex between the polyether and the soluble electrolyte salt with the resin, any commonly used method can be used such as biaxial extrusion and hot rolling. As the molding method of the mixture, any commonly used method can be used such as injection molding, extrusion molding, calendering, compression molding and SMC process.

The plasma treatment is carried out by a procedure in which a low pressure oxidative gas such as oxygen or a mixed gas of nitrogen or argon with it is excited with high frequency discharge or micro wave discharge to form active gas and it is contacted with the surface of the product to be treated, namely molding. The pressure is usually 0.1 to 5 Torr, preferably 0.2 to 1.0 and the temperature is 40° to 100° C. and the treating period is 10 seconds to 10 minutes.

It is preferred that the treating gas contains 18 to 90 volume % of oxygen.

Thus in the present invention, the cation of the soluble electrolyte salt of the above-mentioned complex mixed with the resin can move through the ether oxygen in the polyether and hence ionic conductivity is formed in the resin to lower its resistance.

It exerts a synergetic effect together with the surface-improvement effect due to the plasma treatment performed after molded to produce a resin molding having a very improved electric conductivity and a very good quality.

PREFERRED EMBODIMENTS OF THE INVENTION

The following examples serve to illustrate the invention in more detail although the invention is not limited to the examples.

The surface resistivity in examples was measureted as follows: A voltage of 500 V was applied to the test piece with use of an ultra-insulation resistance tester (4329A type manufactured by Yokogawa Hewlett-Packard Company), and then the surface resistivity was measured after 30 seconds.

EXAMPLE 1

45 g of 1,4-butanediol as a starting material was put in a reactor and 550 g of 1,2-epoxybutane was gradually introduced in it and polymerized by a usual method in the presence of potassium hydroxide as a catalyst. Then the product was purified by desalting to obtain 550 g of a polyether having a molecular weight of 1,100 (calculated from hydroxyl number) and containing 0.23 ppm of $K^+$.

A solution of 25 g lithium perchlorate in 100 g methanol was added to 500 g of the polyether with stirring to obtain a homogeneous solution and then methanol was removed in vacuo to obtain a complex.

30 g of the complex and 1 kg of polypropylene resin were mixed in a biaxial extruder at 180° C. for 10 min. and molded with a hot press method at the same temperature under a pressure of 50 kg/cm$^2$ for 2 min. and surface of the resultant molding (230 mm×230 mm×3 mm) was treated with plasma in a gas containing 89 volume % of oxygen and 11 volume % of nitrogen at a gas flow rate of 6.75 l/min under a pressure of 0.2 mmHg at a temperature of 40° C. and at an outlet power of 1,200 W for 1 min. to prepare a test piece.

EXAMPLE 2

32 g of ethylene glycol was used as a starting material and 667 g of an ethylene oxide/propylene oxide mixture (molar ratio 4:1) was reacted with it in the presence of potassium hydroxide as a catalyst. Then a mixture of 496 g of α-olefin oxide having 12 carbon atoms and 1,334 g of propylene oxide was further reacted with the product and thus obtained product was purified by desalting to obtain 5,140 g of a polyether having a molecular weight of 4,970 (calculated from hydroxyl number) and containing 0.16 ppm of $K^+$.

A solution of 25 g of lithium perchlorate in 100 g of methanol was added to 500 g of the polyether with stirring to obtain a homogeneous solution and then methanol in the solution was removed in vacuo to obtain a complex.

70 g of the complex and 1 kg of polypropylene resin were mixed in a biaxial extruder at 180° C. for 10 min. and molded with a hot press method at the same temperature under a pressure of 50 kg/cm$^2$ for 2 min. (230 mm×230 mm×3 mm) and surface of the resultant molding was treated with plasma in a gas containing 89 volume % of oxygen and 11 volume % of nitrogen at a gas flow rate of 6.75 l/min under a pressure of 0.2 mmHg at a temperature of 40° C. and at an outlet power of 1,200 W for 1 min. to prepare a test piece.

EXAMPLE 3

32 g of ethylene glycol was put in a reactor as a starting material and 1680 g of 1,2-epoxybutane was gradually introduced in it by a usual method in the presence of potassium hydroxide as a catalyst. The reaction product was purified by desalting to obtain 1,690 g of a polyether having a molecular weight of 3,100 (calculated from hydroxyl number) and containing 0.17 ppm of $K^+$.

A solution of 25 g of potassium thiocyanate in 200 g of acetone was added to 500 g of the polyether with stirring to prepare a homogeneous solution and then acetone was removed in vacuo to obtain a complex.

50 g of the complex and 1 kg of polypropylene resin were mixed in a biaxial extruder at 180° C. for 10 min. and molded with a hot press method at the same temperature under a pressure of 50 kg/cm$^2$ for 2 min. (230 mm×230 mm×3 mm) and surface of the resultant molding was treated with plasma in a gas containing 89 volume % of oxygen and 11 volume % of nitrogen at a gas flow rate of 6.75 l/min under a pressure of 0.2 mmHg at a temperature of 40° C. and at an outlet power of 1,200 W for 1 min. to prepare a test piece.

EXAMPLE 4

45 g of sorbitol was put in a reactor as a starting material and 2,500 g of ethylene oxide and 5,500 g of α-olefin oxide having 6 carbon atoms were successively introduced in it by a usual method in the presence of potassium hydroxide as a catalyst. The reaction product was purified by desalting to obtain 7,400 g of a polyether having a molecular weight of 29,700 (calculated from hydroxyl number) and containing 0.35 ppm of $K^+$.

A solution of 25 g of potassium perchlorate in 100 g of methanol was added to 500 g of the polyether with stirring to obtain a homogenious solution and then methanol was removed in vacuo to obtain a complex.

50 g of the complex and 1 kg of polypropylene resin were mixed in a biaxial extruder at 180° C. for 10 min. and the product was molded with a hot press method at the same temperature under a pressure of 50 kg/cm$^2$ for 2 min. (230 mm×230 mm×3 mm) and surface of the resultant molding was treated with plasma in a gas containing 89 volume % of oxygen and 11 volume % of nitrogen at a gas flow rate of 6.75 l/min under a pressure of 0.2 mmHg at a temperature of 40° C. and at an outlet power of 1200 W for 1 min. to prepare a test piece.

COMPARATIVE EXAMPLE 1

1 kg of polypropylene resin was kneaded in a biaxial extruder at at 180° C. for 10 min. and the product was molded with a hot press method at the same temperature under a pressure of 50 kg/cm$^2$ for 2 min. (230 mm×230 mm×3 mm) and surface of the resultant molding was treated with plasma in a gas containing 89 volume % of oxygen and 11 volume % of nitrogen at a gas flow rate of 6.75 l/min under a pressure of 0.2 mmHg at a temperature of 40° C. and at an outlet power of 1200 W for 1 min. to prepare a test piece.

The surface resistivity of the test pieces obtained in Examples 1 to 4 and Comparative Example 1 were as follows.

|  | Surface Resistivity ($\Omega$) |
|---|---|
| Example 1 | $5.9 \times 10^{12}$ |
| Example 2 | $5.7 \times 10^{12}$ |
| Example 3 | $4.5 \times 10^{12}$ |
| Example 4 | $6.7 \times 10^{12}$ |
| Comparative Example 1 | more than $2 \times 10^{16}$ |

No substantial difference was observed in the other physical properties and appearance between the products prepared in Examples 1 to 4 and Comparative Example 1.

As described above, there can be obtained, according to this invention, a resin molding having a very improved electric conductivity without substantially affecting the color and physical properties of the resin.

What is claimed is:

1. A method for improving electric conductivity of a resin molding, which comprises the steps of mixing with a resin a complex of a polyether and an electrolyte salt soluble in said polyether, molding the mixture, and then treating the resultant molding with plasma, said polyether being selected from the group consisting of alkylene oxide polymers and copolymers.

2. A method as defined in claim 1, wherein said polyether is selected from the group consisting of polymers of an alkylene oxide having not less than 4 carbon atoms and block or random alkylene oxide copolymers containing not less than 10 weight % of at least one alkylene oxide unit having not less than 4 carbon atoms.

3. A method as defined in claim 2, wherein said polyether has a molecular weight of 1,000 to 100,000 and is selected from the group consisting of polymers of an alkylene oxide having not less than 4 carbon atoms and block or random alkylene oxide copolymers containing not less than 10 weight % of at least one alkylene oxide unit having not less than 4 carbon atoms.

4. A method as defined claim 3, wherein electrolyte salt is at least one inorganic salt selected from the group consisting of lithium chloride, lithium bromide, lithium iodide, lithium nitrate, lithium perchlorate, lithium thiocyanate, sodium bromide, sodium iodide, potassium thiocyanate and potassium iodide and is used in an amount of 0.5 to 10 weight % based on said polyether.

5. A method as defined claim 4, wherein said complex is used in an amount of 1 to 10 weight % based on said resin.

* * * * *